United States Patent [19]

Lans

[11] 4,303,986

[45] Dec. 1, 1981

[54] DATA PROCESSING SYSTEM AND APPARATUS FOR COLOR GRAPHICS DISPLAY

[76] Inventor: Hakan Lans, Oviksgaten 43, 162 21 Vallingby, Stockholm, Sweden

[21] Appl. No.: 2,017

[22] Filed: Jan. 9, 1979

[51] Int. Cl.[3] .................. G06F 3/14

[52] U.S. Cl. .................. 364/900; 340/703; 340/709; 340/715; 340/750; 340/798; 340/799; 340/800; 340/801

[58] Field of Search ... 364/200 MS File, 900 MS File; 340/703, 799, 709, 715, 750, 798, 800, 801

[56] References Cited

U.S. PATENT DOCUMENTS

| | | | |
|---|---|---|---|
| 3,728,683 | 4/1973 | Biegert et al. | 364/900 |
| 3,781,822 | 12/1973 | Ahamed | 364/900 |
| 3,967,266 | 6/1976 | Roy | 340/709 |
| 4,119,955 | 10/1978 | Nichols | 340/703 X |
| 4,149,152 | 4/1979 | Russo | 340/703 |
| 4,228,430 | 10/1980 | Iwamura et al. | 340/709 |

*Primary Examiner*—Raulfe B. Zache
*Attorney, Agent, or Firm*—Hubbard, Thurman, Turner, Tucker & Glaser

[57] ABSTRACT

A system and apparatus for managing the picture memory of a digital color graphics imaging system, thereby enabling images on a display monitor to be changed efficiently at high rates, and more specifically a control system which comprises a video memory controller having an internal memory for a digital color graphics imaging system. The controller operates under the direction of a host computer to generate synchronized color data signals for input to a cathode ray tube monitor or other suitable graphical display device. The controller is effective to randomly address its memory at high speed and serially read, but not serially write, the data stored in the memory at TV rates for displaying on the monitor. The particular embodiment of the controller disclosed herein has a universal organization which may be adapted for use in various computer graphics systems. The controller may be operated by software capable of automatic stepping in X and Y directions to provide for transfer of data into the memory using a first word length and for transfer of data out from the memory using a second longer word length, the controller including specific X and Y address registers for computer addressing into the controller's internal memory at those memory locations specified by the computer or at locations which are reached by incrementing or decrementing the X and Y address registers one step in X and/or Y directions or by loading a new absolute address, the controller being capable of determining and changing values of each word to be stored in memory for presentation on the monitor at a specific location based upon a previous value of that same word combined with other input data from the host computer.

30 Claims, 7 Drawing Figures

DATA PROCESSING SYSTEM AND APPARATUS FOR COLOR GRAPHICS DISPLAY

Attached hereto are three appendix sheets labelled A, B, and C which give the contents of the four PROMs used in the presently disclosed controller circuit 40. The information is presented in the hexadecimal programming format known as ASCII-hex, well known in the art. The addresses, as for example A000, A080, are also given in hexadecimal. Appendix A gives the contents of PROMs 108 and 112, Appendix B gives the contents of PROM 135 and Appendix C gives the contents of PROM 152.

The present invention pertains generally to graphic imaging systems, and more particularly to high speed real time color data procesing instruments operable under the direction of a host computer for displaying color graphic information on a cathode ray tube monitor or specially adapted color television monitor.

With the advent of low cost digital processing, the art of raster scan computer graphics has become technically practical. Depending on resolution and the numbers of colors, a single frame in a television display can contain up to 500,000 bits of information, which may be updated as many as 30 times per second. A popular technique for processing such large amounts of information is by means of a raster scan. In the United States, the TV raster standard is 525 horizontal lines, scanned in an odd and even interlaced line pattern. The scanning spot moves horizontally across alternate lines stepping downward on the screen and then returns to the top and scans the remaining lines to complete one picture frame.

Although different levels of X-Y picture resolution are possible using a conventional color CRT monitor, such as 480 by 640 or 512 by 512 addressable picture elements (pixels), the present invention is directed to a system employing a picture memory having 256 by 256 pixels. Each pixel preferrably consists of 4 bits of binary coded color information, or a 4-bit pixel word.

With the above in mind, it will be apparent that it is necessary to provide on the order of 64,000 4-bit pixel words in a picture memory in order to process the picture information out to the CRT monitor. It has been the practice in the prior art to employ high speed static memories having a density of about 1,000 memory bits per integrated circuit package. Thus, it has been necessary to employ 256 such static 1K memory IC's in order to store the 256 by 256 by 4-bit picture memory. State of the art dynamic random access memories, which contain 16K bits per IC device, would be an attractive alternative for reasons of economy compared to the 1K static RAMs presently employed. However, the 16K dynamic RAMs have a much slower memory cycle time than the 1K static RAMs. For example, conventional 16K dynamic RAMs have a memory cycle of about 400 nanoseconds, and it will be appreciated that it is necessary to transfer information to the CRT monitor at a rate of about 133 nanoseconds per 4-bit pixel. Accordingly, the principal object of the present invention is to provide a color data processing apparatus having a speed compatible with the requirements of a 256 by 256 pixel resolution color CRT monitor and employing 16K dynamic RAMs to construct the memory.

The principal object as well as other objects and advantages are achieved in accordance with the present invention by providing a color data processing instrument or a video memory controller having a plurality of high capacity dynamic random access memories organized to read out a plurality of color data bits to a group of fast acting latches arranged in parallel to provide at least four pixel words sequentially to the CRT monitor during each memory cycle.

For example, the controller can be operated under the direct control of a minicomputer having a general purpose parallel interface with the controller, or the controller can be operated by a remote minicomputer through a conventional serial interface communicating with the controller through a microprocessor adapted to convert the serial signals from the minicomputer to a suitable parallel format such as described in detail herein. With a low speed serial interface, the microprocessor can be used for high speed vector generation. The controller can be operated under the direction of software in a microprocessor alone or minicomputer alone or in a combined microprocessor and minicomputer system. A particular advantage of the present controller is that a minicomputer can be readily programmed using conventional incremental plotter software with only minor modifications.

The various advantages and novel features of the present invention may best be understood by reference to the following detailed description of an illustrative embodiment, wherein.

Figure 1:
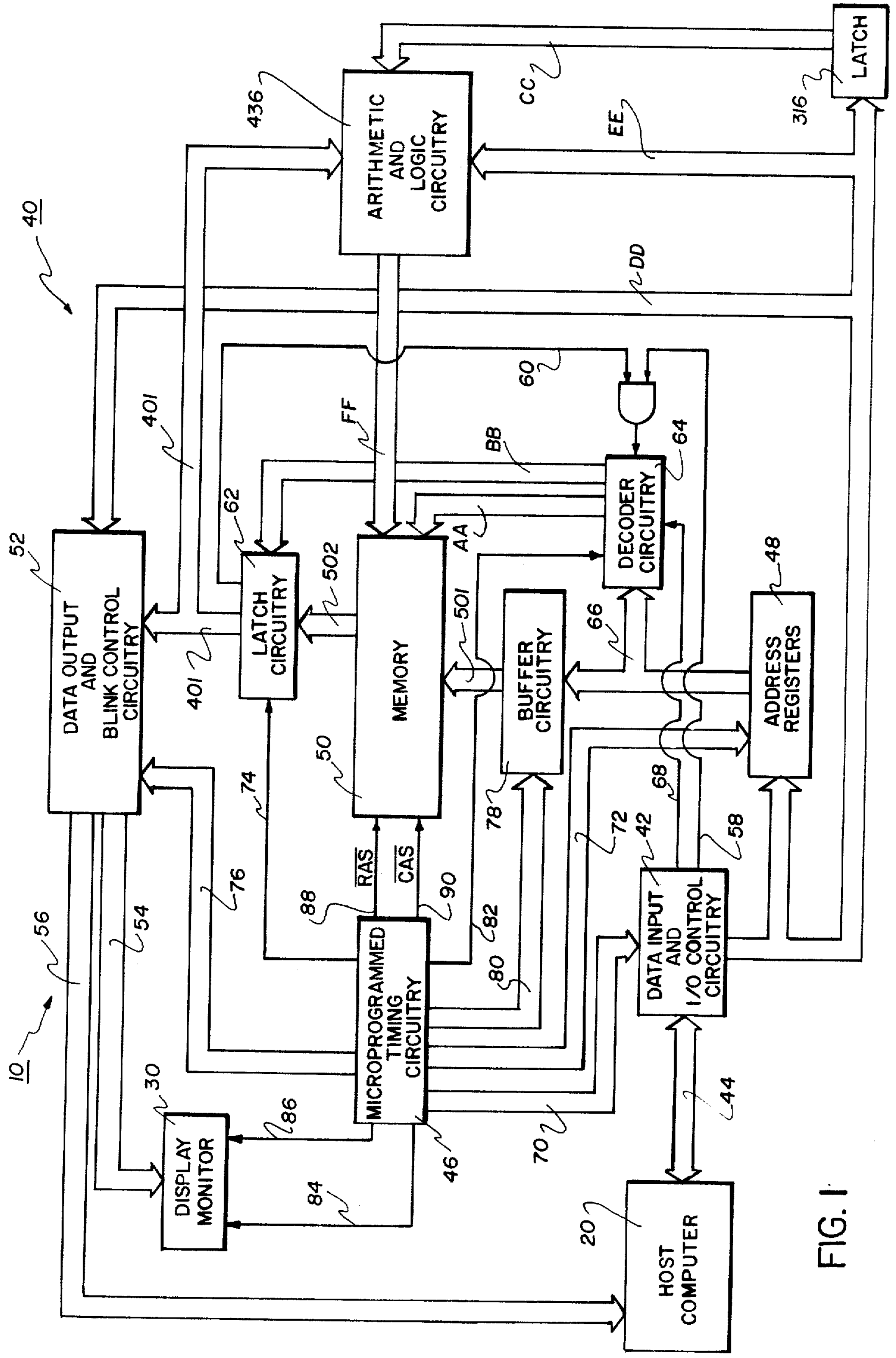
FIG. 1 is circuit block diagram of the inventive system.

Referring now to the drawings, a presently preferred embodiment of the inventive system will be described in detail, like reference numerals designating like circuit portions in the various figures. To further facilitate the description of the detailed circuit block diagram illustrated in FIGS. 2A through 2E, letters of the alphabet are used to designate bus lines and signal lines common to the circuit portions of the separate figures. Also seen in FIGS. 2A through 2E are the part numbers and pin number locations of the presently preferred IC devices available from Texas Instruments Incorporated of Dallas, Tex.

Referring to FIG. 1, a digital color graphics imaging system in accordance with the present invention is illustrated and designated generally by reference numeral 10. The system 10 comprises a host computer 20, a display monitor 30 and a video memory controller designated generally by reference numeral 40. The controller 40 is a high speed digital machine which processes binary coded color data under the direction of software stored in the host computer 20 and outputs the color data to the monitor 30. In the description which follows, it will be assumed that the monitor 30 is a conventional color CRT. It will be appreciated, however, that other kinds of monitors, such as a black and white CRT or a laser scanner display, can be employed with the controller 40.

The host computer 20 sends data and control signals to a portion of the controller 40 referred to as data input and I/O control circuitry 42 via a conventional parallel interface or bus 44. The controller 40 includes microprogrammed timing circuitry 46 and internal address registers 48 for performing operations on picture memory 50 via arithmetic and logic circuitry 436. The binary coded color data read out of the memory 50 is processed by circuitry 52, which includes means for blink control, prior to being output to the monitor 30 via a 4-bit data bus 54. The data output is also communicated to the host computer 20 via another 4-bit data bus 56 to provide a "handshaking" between the controller 40 and the host computer 20.

The four bits of data transmitted through bus 54 to the monitor 30 can be coded representations of 16 different colors or can be coded representations of 8 different colors leaving one bit for available to protect against writing on preselected portions or fields of the monitor's screen. In the later case, which will be described by way of example herein; a write protect signal 58 is generated in the I/O control circuitry 42 is ANDed with a signal 60 from memory output latch circuitry 62 and the result is fed to decoder circuitry 64, which in turn selectively sends write signals to the memory 50 via bus AA. The latch circuitry 62 sends four color data bits from the memory 50 to the output circuitry 52 via data bus 401. One of these four bits, such as the most significant bit, indicates whether the particular picture element (pixel) is in a protected field, and this bit is also carried by the signal line 60. Thus, when both the write protect line 58 and the signal line 60 are high, the write cycle of the memory 50 is inhibited in decoder circuitry 64. However, when the write cycle is not inhibited, the decoder circuitry 64 selects the portion of the memory 50 to be written into by decoding the address information received from registers 48 via bus 66 coincident with a write signal on line 68 from the control circuitry 42.

Figure 2A:
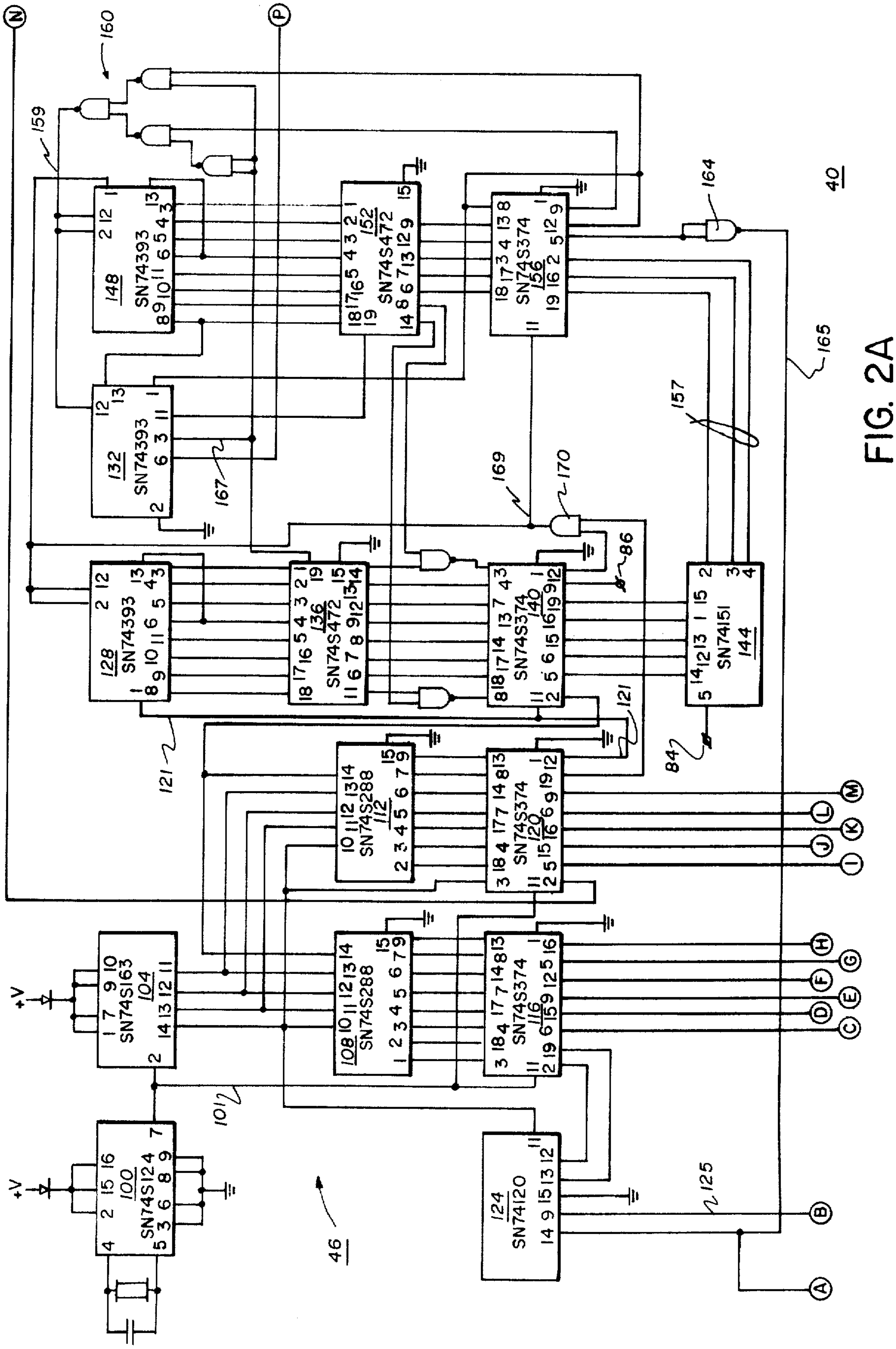
FIG. 2A is a detailed circuit block diagram of a portion of the system for generating timing signals.
Figure 2B:
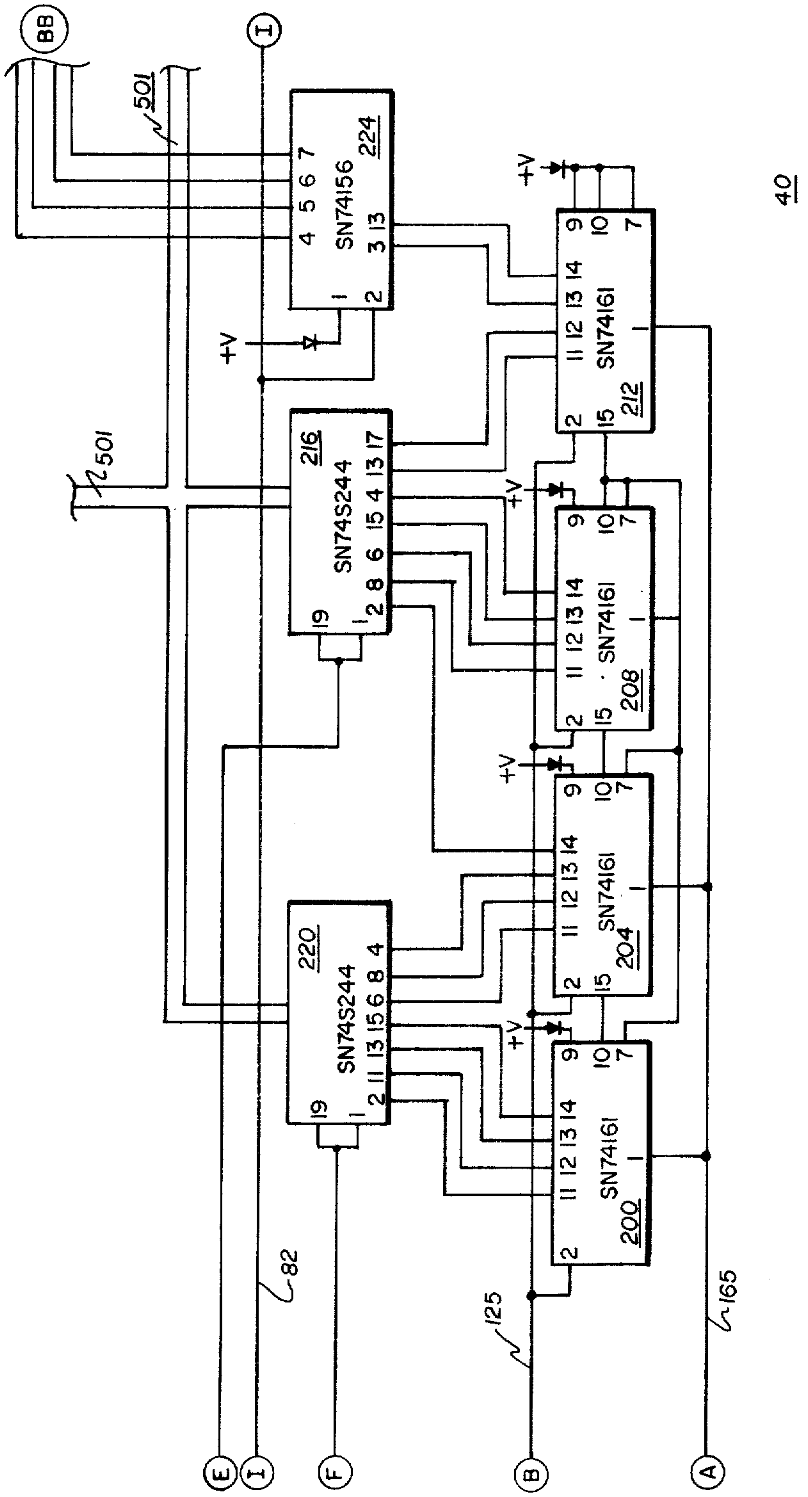
FIG. 2B is a detailed circuit block diagram of a portion of the system for sequentially addressing the picture memory during CRT scanning.
Figure 2C:
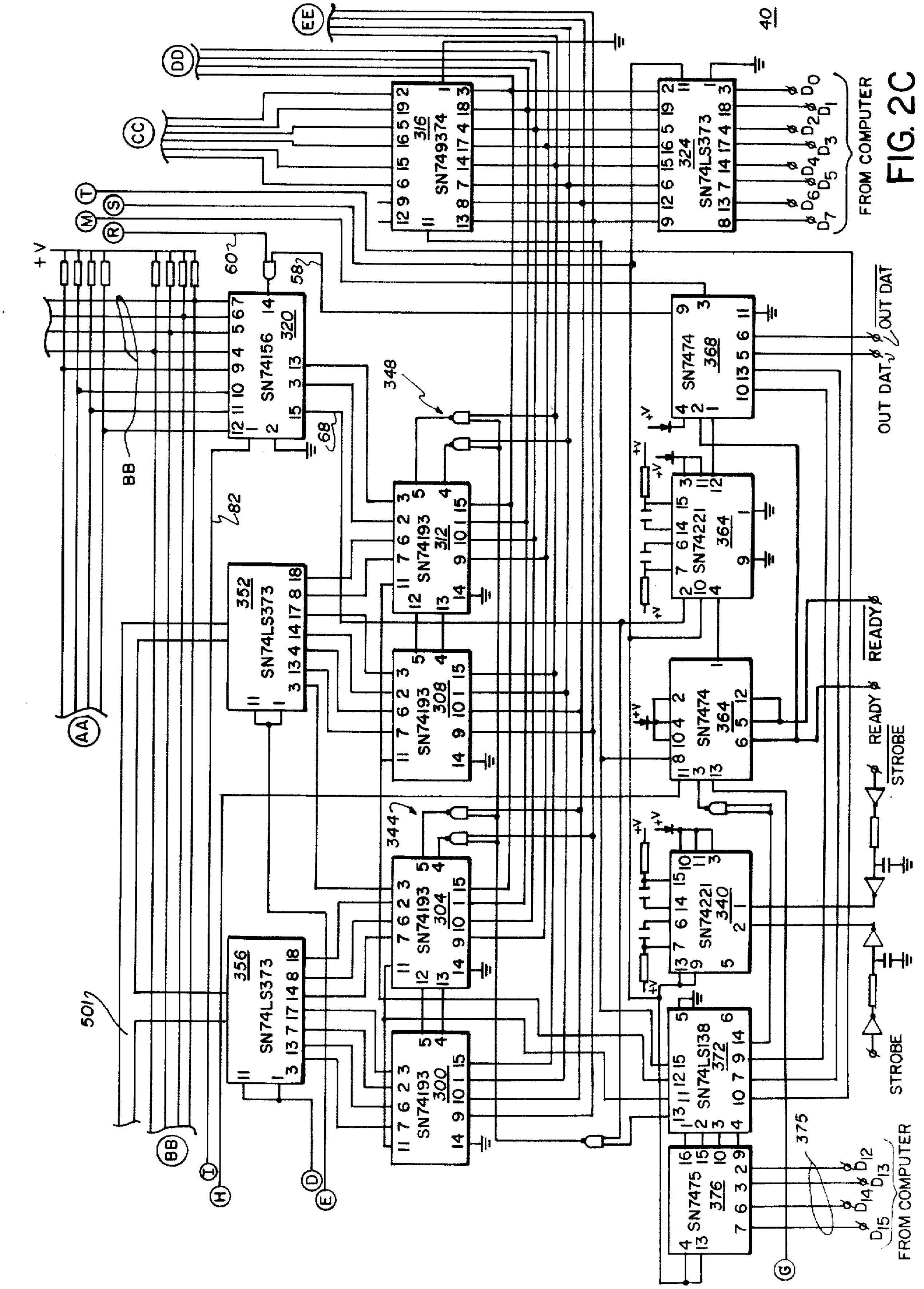
FIG. 2C is a detailed circuit block diagram of a computer interface portion of the inventive system with I/O control circuitry and circuitry for random addressing of the picture memory during the memory write cycle.
Figure 2D:
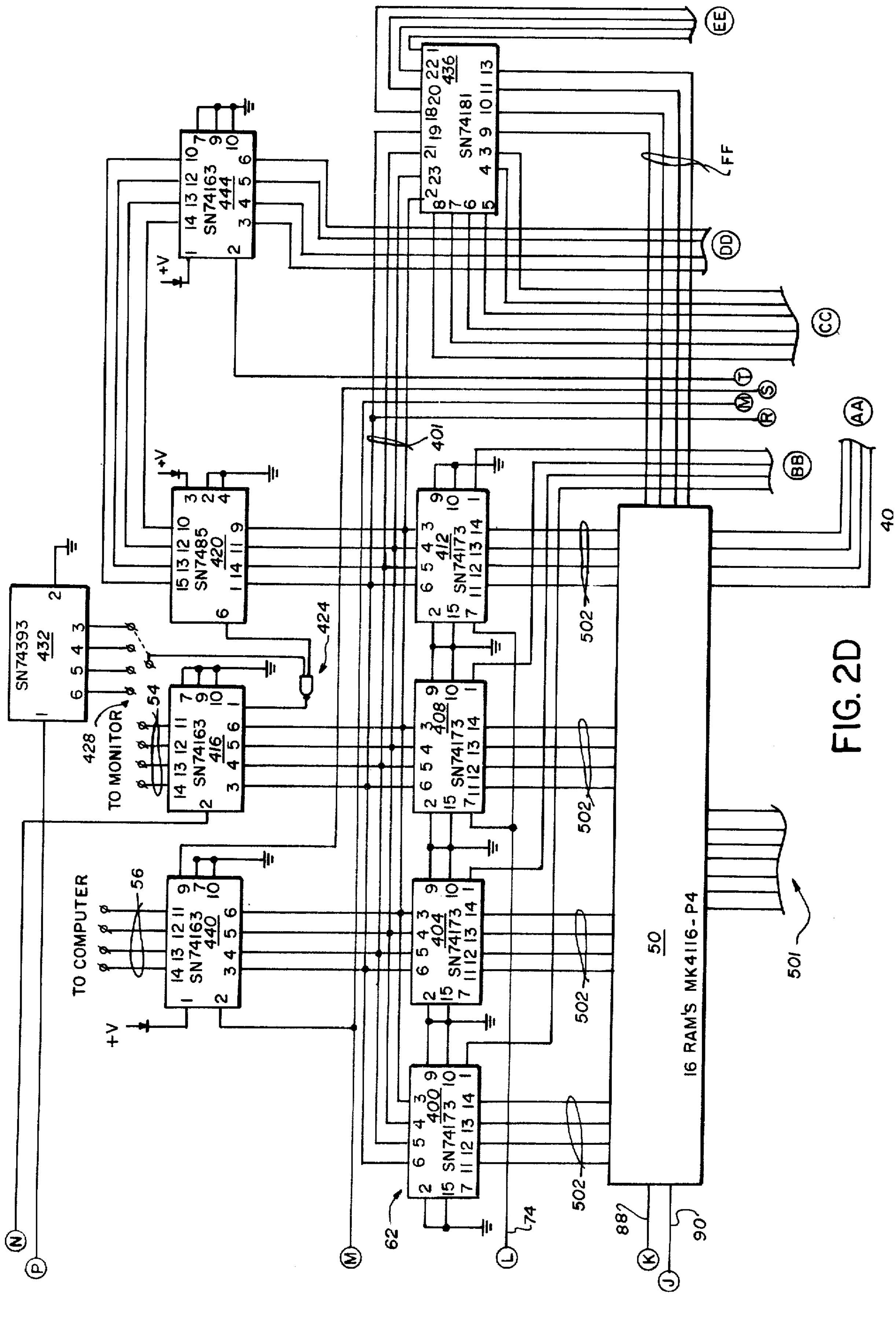
FIG. 2D is a detailed circuit block diagram of a portion of the system including the memory and data output circuitry.
Figure 2E:
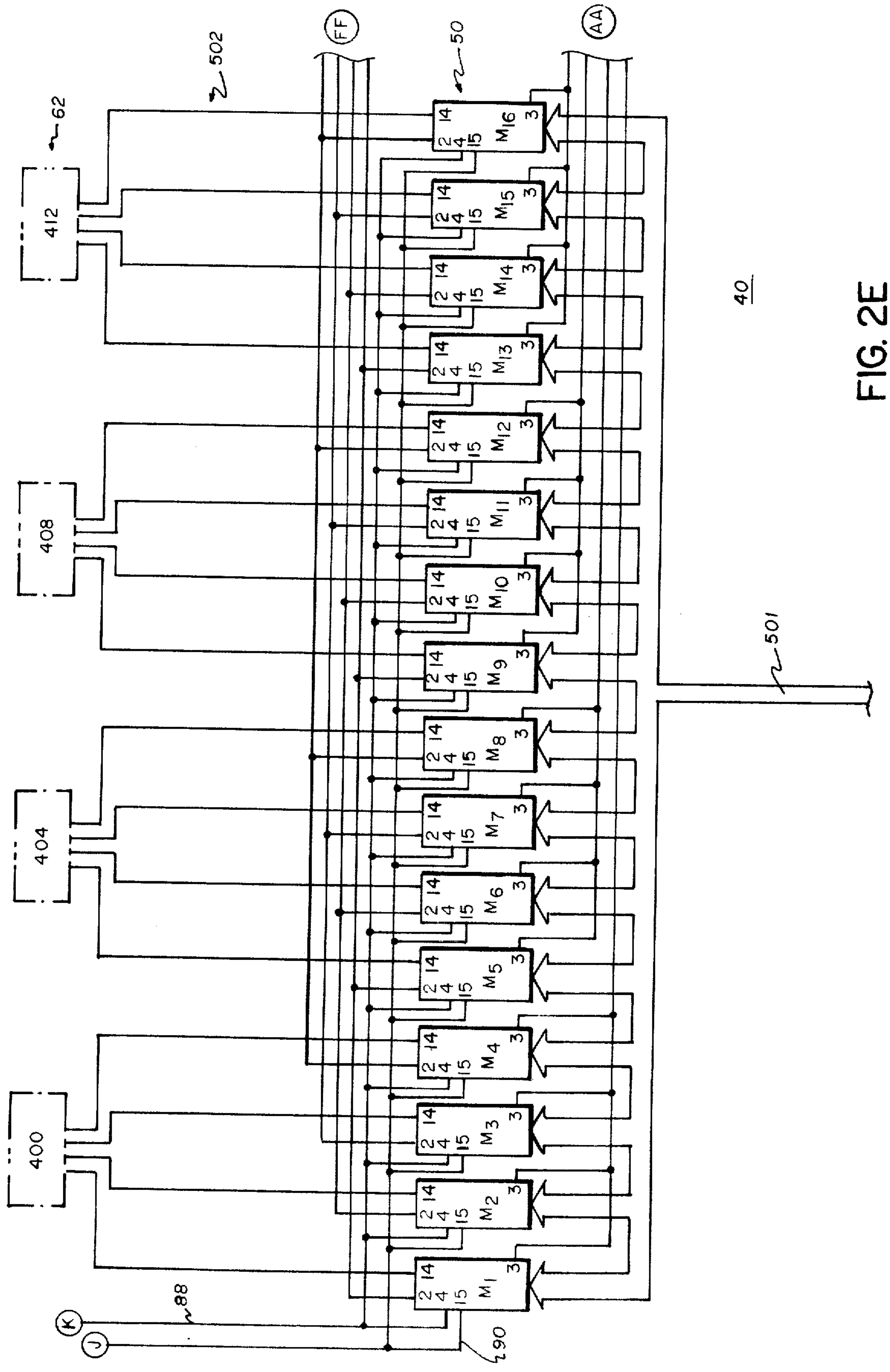
FIG. 2E is a detailed circuit block diagram of the preferred memory organization using sixteen 16K dynamic RAMs.

Referring briefly to FIG. 2E, a preferred memory organization is illustrated as comprising sixteen dynamic random access memories M1 through M16, each of which having 16K bits of memory storage capacity. It will be appreciated that the cycle time of such 16K-RAMs is relatively slow, about 400 nanoseconds, compared to the scan rate of conventional color CRT monitors which is about 133 nanoseconds per pixel. Therefore, in accordance with a unique feature of the present invention, a 16-bit word is read from the memory 50, one bit from each RAM, and then split into four groups of four by the latch circuitry, which consists of four fast acting latches 400, 404, 408 and 412. Referring again to FIG. 1, it will be appreciated that the latch circuitry 62 can put out the sixteen bits of information in a four stage sequence of 133 nanoseconds per stage, thereby giving the memory 50 sufficient time to proceed through the next read cycle. Accordingly, the memory organization exemplified by FIG. 2E permits the use of relatively low speed dynamic RAMs for reading out color data at TV scan rates.

The internal timing for the controller 40 is generated in circuitry 46, which sends the necessary clock and clear signals as seen in FIG. 1 to the I/O circuitry 42 via bus 70, to the address registers via bus 72, to the latch circuitry 62 via clock line 74 and to the output and blink circuitry via bus 76. In addition, the circuitry 46 selects one of four address buffers in buffer circuitry 78 via bus 80, and one of two decoders in decoder circuitry 64 via line 82. The timing circuitry 46 also generates mixed sync and blanking signals on lines 84 and 86 to the monitor 30 as well as row and column address strobe signals on lines 88 and 90 to the memory 50.

In accordance with a unique feature of the invention controller 40, all data from the host computer 20 is processed by the arithmetic and logic circuitry 436 to permit both arithmetic and logic operations to alter selected portions of the picture memory, as will be appreciated better by the following description of the detailed circuit schematic of the controller 40. Briefly, as seen in FIG. 1, an intermediate latch or control function register 316 is provided so that two sets of incoming data from the host computer can be demultiplexed on their way to the circuitry 436. The first set of data comprises a 6-bit binary coded instruction transferred through latch 316 via bus CC. The second set of data comprises 4 bits of binary coded color data transferred to circuitry 436 via bus EE. An arithmetic or logic operation is performed on the two sets of data on busses EE and 401 as determined by the instruction on bus CC, the result being returned to the picture memory via bus FF.

FIG. 2A illustrates the details of the preferred timing circuitry 46, which includes a crystal oscillator 100 generating from its pin 7 a 15 megahertz clock signal 101 which passes to a divide-by-16 counter 104. Counter 104 produces output signals on its output terminals 11-14, which signals become addressors into two 32-word by 8-bit PROMs 108 and 112. These two PROMs contain data patterns which are used to generate timing pulses which in turn are clocked into octo-latches 116 and 120 by the 15 megahertz clock signal 101 applied at pin 11 of the latches 116 and 120. The outputs of octo-latches 116 and 120 provide the various timing signals mentioned above. The basic machine cycle used is sixteen fifteenths of a microsecond for read, arithmetic/logic, write and address transfer operations.

The latch 120 generates an output 121 for clocking a counter 128 having duo binary counters which provide the address for a 512-word by 8-bit PROM 136, which is used to generate timing signals in the horizontal direction of the TV scan (i.e., horizontal sync, horizontal blanking and horizontal timing). The two binary counters in counter 128 become the horizontal counters for the TV scan format. The timing signals from PROM 136 are strobed into a latch 140, one output of which is the blanking signal 86. A multiplexer 144, which is controlled by vertical timing signals 157, produces a composite sync or mixed sync signal 84 on its output terminal in response to certain additional outputs from latch 140 as shown. IC counters 132 and 148 count off the vertical scan lines of the TV scan format and 512-word by 8-bit PROM 152 produces timing signals which are delatched in octo-latch 156 to provide the vertical timing signals 157 as well as data signals for resetting the counters 132 and 148 by means of an end-of-picture signal 159 from NAND gates 160. A clear signal 165 is also generated by PROM 152 through latch 156 and gate 164 to reset the address counters 200, 204, 208 and 212, as seen in FIG. 2B. The clear signal 165 is also input to a synchronized gate 124 which increments the counters 200, 204, 208 and 212 in a manner to be described more fully below. Finally, an odd/even picture signal 167 is output from pin 3 of counter 132 and an end-of-line signal 169 is generated at the output of AND gate 170 for the respective timing functions as will be appreciated by those skilled in the art.

In summary, the responsibility of IC's 100, 104, 108, 112, 116 and 120 is to generate timing for memory operations while the responsibilities of IC's 128, 132, 136, 140, 144, 148, 152, 156 and gates 160 and 170 are to generate the timing signals necessary to establish the TV scan format using the techniques of generating clocking signals defined using PROM coding.

Referring to FIG. 2E, the memory 50 preferably comprises sixteen 16K dynamic RAMs M1 through M16 in which a picture memory of 256 by 256 by 4 bits is stored. The memory 50 conveniently provides a 16-bit output data format whih can be time multiplexed into a 4-bit wide output using four fast acting latches 400, 404, 408 and 412. Similarly, 4-bit wide input on bus FF can be used to sequentially load the memories of FIG. 2E by selecting one of four groups of four RAMs by means of bus AA to enable writing in 4 memory chips at a time.

Two sets of address registers are used. One set comprises the TV read mode address registers 200, 204, 208 and 212 of FIG. 2B. Cursor address registers 300 and 304 for the Y coordinates and registers 308 and 312 for the X coordinates comprise the second set, as best seen in FIG. 2C. It is the address of these cursor registers 300, 304, 308 and 312 which determines the location into which data is to be written off 4-bit data bus FF and to be read onto 16-bit data bus 502, which data is distinct from the TV output. This cursor address can be incremented or decremented in both X and/or Y directions so that it may be moved in any one of 8 directions from a current location.

Referring to FIG. 2B, the registers 200, 204, 208 and 212 are synchronous binary counters which form the TV read mode address register to read out 256 4-bit word locations per scan line over 256 scan lines. The most significant 14 bits of the address from this address register pass into tri-state buffers 216 and 220 to be strobed onto the 7-bit address bus 501. It is standard in 16K dynamic RAMs to use the 7-bit address bus to address the full 14-bit address register within the memory chip, $2^{14}$ being approximately 16,000. This is done by first sending a row address of 7 bits and then a column address of 7 bits sequentially prior to each read or write cycle of the memory 50. Thus, buffer 216 sends the lower significant 7 bits and buffer 220 sends the upper significant 7 bits onto the same 7-bit address bus 501 and these two pairs of 7-bit addresses are strobed using pins 4 and 15 of the RAMs as seen in FIG. 2E with inverted RAS for row address strobe and inverted CAS for column address strobe, on lines 88 and 90, respectively. The lower significant 2 bits of the memory address, pins 13 and 14 of counter 212, are decoded in decoder 224 to produce 4 lines on bus BB which are used as seen in FIG. 2D to select via the latch circuitry 62 one of four groups of 4 bits of data read out on the 16 data out lines 502 of the dynamic RAMs M1 through M16 of the memory 50.

In particular, in each major memory cycle, all 16 lines from bus 502 produce output data. In each subcycle, of which there are 4 for each memory cycle in the TV read mode, one of the 4 groups of 4 bits of data is outputted onto an output tri-state bus 401 from one of the latches 400, 404, 408 and 412 of FIG. 2D. This data is then strobed in the 4-bit binary register 416 for output to the monitor 30 at the clock rate of the register 416, which in this example is 7.5 megahertz. Thus, the subcycles occur at a 7.5 megahertz rate and the main memory access cycles occur at one quarter of that rate. It will therefore be appreciated that the memory 50 can complete a cycle while the latches 400, 404, 408 and 412 are sequentially selected for output onto bus 401 using the one-of-four select bus BB. The output of register 416 may therefore be used to represent 1 of 16 possible binary coded colors of 1 of 8 such colors and a write protected field, as mentioned above. Additionally, output color code 0 from register 416 can have a special significance and is asserted by comparator 420 when the code on the output tri-state bus 401 is identical to data from latch 444 which represents a blink mask loaded from the host computer 20 via the four least significant bits of an input latch 324, seen in FIG. 2C. When this equality occurs, the color out data on the output of register 416 corresponds to binary color 0000, as NAND gate 424 clears the content of register 416 through pin 1.

The facility for clearing the contents of register 416 and therefore zeroing the color out signal, whenever the output signal corresponds to a preset input, provides a blinking facility to enable a given color to be blinked. Blinking is the turning ON or turning OFF at a clock rate which is determined by selectively connecting terminal 428 to one of four outputs of counter 432 seen in FIG. 2D. Terminal 428 is in turn connected to the upper input line to gate 424, thereby determining the frequency of the blink rate of the selected color defined in the four least significant bits of the input latch 324. The blink rate is a divided-down form of the signal from pin 6 of counter 132, which is one of the counters in the vertical count chain of the TV sweep generation logic.

The output tri-state bus 401 is fed from one of the four tri-state output 4-bit D-type latches 400, 404, 408 and 412, depending on the output from decoder 224 when reading in TV mode or from decoder 320 when reading in computer I/O or cursor mode. The data on bus 401 also provides an input into an arithmetic/logic unit (ALU) 436 seen in FIG. 2D. The purpose of the ALU 436 is to provide the facility for performing logical and arithmetic operations between the output of the memory 50 on the output tri-state bus 401 and some preset data loaded from the host computer 20 to appear at the output of octo-latch 324 in the four most significant bits. The operation to be performed is defined by the 6 least significant bits out of octo-latch 316 also to be loaded from the host computer 20 at a different time.

The output tri-state bus 401 containing the 4 bits of memory data is also passed to register 440, which is used to return the output data to the host computer 20 at the conclusion of each memory I/O cycle, and to the blink mask comparator 420, as previously mentioned.

As already pointed out, there are two modes of addressing the memory 50. One is the TV read mode for displaying the data, which as seen in FIG. 2B, uses address registers 200, 204, 208 and 212 incrementing synchronously with the TV scan format. The address registers 200, 204, 208 and 212 are 4-bit output synchronous counters controlled by a clock signal 125 from the synchronized gate 124 which in turn is controlled from pins 2 and 19 of latch 116 as seen in FIG. 2A. The other mode is the computer I/O mode for output data which is addressed using an address register split into an X and Y component, the X component of the address being stored in registers 308 and 312, the Y component of the address being stored in registers 300 and 304. As will be appreciated from FIG. 2C, these X and Y registers can be loaded with data from the computer 20 received in the octo-latch 324, used as an input latch, or can be incremented or decremented one step in X and/or Y directions under control of the incoming coded function control lines 375 from the computer 20 to latch 376. The incoming data on lines 375 is decoded by function decoder 372 to provide one of eight different possible function instructions, which will be described more fully below. One of the eight instructions, however, when combined with the data from the four least significant bits of latch 324, will produce the desired incrementing or decrementing of the X and/or Y cursor addresses in counter registers 300, 304, 308 and 312.

In summary, incrementing or decrementing the X address counters 308 and 312 and/or the Y address counters 300 and 304 is accomplished by a strobe signal from the computer 20 to a dual monostable multivibrator 340, generating a delay pulse which triggers from the first monostable multivibrator in unit 340 which, in turn, triggers the second monostable multivibrator in unit 340 producing an output at pin 5 thereof. When pin 5 goes high, the decoded function data is strobed into counter registers 300, 304, 308 and 312 to increment or decrement the X and/or Y cursor addresses. Whether an increment, a decrement or no step at all occurs, depends upon the condition of the four least significant outputs of buffer latch 324 which, in conjunction with gates 344 for Y and gates 348 for X, enables the count up or count down inputs at pins 5 and 4 of registers 304 and 312, respectively.

An alternative way to establish data in the X registers 308 and 312 and Y registers 300 and 304 is by directly loading address data from the output of buffer latch 324 into either the X address register or the Y address register, by providing the appropriate instruction from the computer 20 to the function input lines 375.

Another one of the eight function instructions from decoder 372 enables the control function latch 316, which provides a 6-bit coded instruction to the ALU 436, to select one of several different logical or arithmetic operations to be performed by the ALU 436 seen in FIG. 2D. Still another one of the eight function instructions enables the blink mask latch 444 to receive data from the four least significant bits of the input latch 324 and to output such data to the comparator 420 which in turn clears the output latch 416 to the monitor 30 whenever the data on output bus 401 matches the blink mask data coincident with an enabling signal at gate 424 from the blink rate generator 432, previously described. The color to be blinked is determined by the output from the four least significant bits from the input latch 324 on receipt of a strobe signal into monostable multivibrator 340 when the blink enable instruction is received on lines 375.

The address structure used to address X and Y locations from the X address register or counters 308 and 312 and the Y address register or counters 300 and 304 is understood by recognizing that the memory 50 is organized, as far as the output tri-state bus 401 is concerned, as an array of 256 by 256 4-bit words, as previously mentioned. The two least significant bits of the word address, whether referenced to the address registers 200, 204, 208 and 212 or the address registers 300, 304, 308 and 312 select one of the 4 groups of 4-bit latches 400, 404, 408 and 412 via decoders 224 and 320, respectively. Each raster line of scan requires 256 4-bit words and these words are addressed by the seven bits of the read mode address register provided to buffer 216 by counters 204, 208 and 212 or by the seven bits of the X cursor or computer I/O address register provided to buffer 352 by counters 308 and 312. The image also contains 256 raster lines and these are addressed by the seven bits of the read mode address register provided to buffer 220 by counters 200 and 204 or by seven bits of the Y cursor or computer I/O address register provided to buffer 356 by counters 300 and 304. The outputs from pins 2 and 3 of counter 312 are fed to decoder 320, which in turn generates driver outputs on pins 4 through 7 to select via bus BB one of the four 4-bit D-type output latches 400, 404, 408 and 412 for reading operations. Similarly, the outputs from pins 9 through 12 of decoder 320 are used to select via bus AA the appropriate write enable line for the purpose of writing data into memory 50 from the output of the ALU 436 via bus FF.

Since the cursor addressing of the memory 50 proceeds in the same manner as the row and column addressing from the TV read mode address register provided by counters 200, 204, 208 and 212, reference is made to the previous discussion thereof. Briefly, the cursor addressing proceeds as follows. As seen in FIG. 2C, the most significant 6 bits of the X cursor address from counters 308 and 312 are fed into the tri-state buffer 352 and thence on to the 7-bit address bus 501, together with the least significant bit from counter 304. The Y address data is provided by the most significant 7 bits from counters 300 and 304, which in turn pass through tri-state buffer 356 onto the address bus 501. The respective times at which the outputs of buffers 352 and 356 are stobed onto the address bus 501 is determined by outputs from the timing octo-latch 116 in response to patterns stored in the PROM 108 of the timing circuitry seen in FIG. 2A.

A first Bistable flip/flop provided in unit 360 of FIG. 2C generates ready and ready compliment signals, either one or both of which are coupled to the host computer 20 to indicate that the color processor 40 is ready or busy in response to a signal from the first monostable multivibrator of unit 364. A second flip/flop provided in unit 360 generates the write signal 68 (previously discussed with reference to FIG. 1) which is input to pin 15 of decoder 320. A second monostable multivibrator of unit 364 is triggered at pin 10 in response to the strobe compliment line going into monostable multivibrator unit 340 at pin 1 and is used to clock the flip/flop in unit 368, which in turn signals the host computer 20 that output data is ready on the output of latch 440.

Referring to Table I a graphical explanation is given of the eight presently employed function instructions from the host computer 20 to the controller 40. In the present system, a sixteen line standard interconnect is used for data input from the host computer 20 to the controller 40, which lines are designated D0 through D15. Referring to FIG. 2C, lines D0 through D7 are input to latch 324 and lines D12 through D15 are input to latch 376. As seen in Table I, lines D8 through D11 are not presently used. The binary equivalents of the four bits D12 through D15 are listed in the column adjacent thereto. It will be appreciated that these four binary bits can provide as many as sixteen different function instructions when decoded by IC unit 372, thereby providing the system with expansion possibilities. The eight presently employed function instructions, which are listed at the bottom of Table I, determine the treatment to be given to the eight data bits D0 through D7 input to latch 324. Referring to the top of the table, it will be appreciated that function F0 instructs the controller 40 to input the six least significant bits D0-D5 to the control function latch 316 for determining the particular arithmetic or logic function to be performed in ALU 436. Similarly, functions F1 and F2 instruct the controller to perform address stepping in the registers 300, 304, 308 and 312 in the X and Y directions as indicated in Table I and in accordance with the information incoming on data bits D0-D3. Those skilled in the art will appreciate that function F1 corresponds to a pin down instruction and function corresponds to a pin up instruction in the analogy of an incremental plotter during stepping operations. Accordingly, it will be appreciated that a modified form of incremental plotter software may be employed in the host computer 20 of the present system 10.

TABLE I

| Interface data bit | F = 3 X-data | F = 4 Y-data | F = 1 write stp | | F = 2 only step | | F = 0 control | | F = 5 blink | |
|---|---|---|---|---|---|---|---|---|---|---|
| $D_0$ | X-LSB | Y-LSB | X+ | step | X+ | step | $2^0$ | processor | $2^0$ | blink |
| $D_1$ | | | X− | direction | X− | direction | $2^1$ | control | $2^1$ | mask |
| $D_2$ | | | Y+ | | Y+ | | $2^2$ | func | $2^2$ | |
| $D_3$ | | | Y− | | Y− | | $2^3$ | | $2^3$ | |
| $D_4$ | | | $2^0$ | color | — | not | $2^4$ | | — | not |
| $D_5$ | | | $2^1$ | data | — | used | $2^5$ | | — | used |
| $D_6$ | | | $2^2$ | | — | | — | | — | |
| $D_7$ | X-MSB | Y-MSB | $2^3$ | | — | | — | | — | |
| $D_8$ | not used | | | | | | | | | |
| $D_9$ | not used | | | | | | | | | |
| $D_{10}$ | not used | | | | | | | | | |
| $D_{11}$ | not used | | | | | | | | | |
| $D_{12}$ | $2^0$ | Function: | F = 0 | set processor control function | | | | | | |
| | | | F = 1 | write color and step | | | | | | |
| $D_{13}$ | $2^1$ | | F= 2 | only step | | | | | | |
| | | | F = 3 | load X-data | | | | | | |
| $D_{14}$ | $2^2$ | | F= 4 | load Y-data | | | | | | |
| | | | F = 5 | load blink mask | | | | | | |
| $D_{15}$ | $2^3$ | | F = 6 | set write protect | | | | | | |
| | | | F = 7 | reset write protect | | | | | | |

TABLE II

| DATA COLOR I/O tieming in μS | | | | |
|---|---|---|---|---|
| PARAMETER | | MIN | TYP | MAX |
| tc | cycle time | 0.7 | 2 | 35 |
| tws | strobe pulse with | 0.15 | | |
| tsud | data setup time | | | 0.3 |
| thd | data hold time | 0.6 | | |
| tb | busy time | 0 | 2 | 35 |
| tpr | busy delay time | 0.5 | | 0.7 |
| tpo | output delay time | | | 0.2 |
| tpd | output data delay time | 0 | | 0.01 |

Continuing with the description of the functions from Table I, color data information is input on lines D4-D7 to latch 324 coincident with an F1 function instruction, which data is transferred to the ALU 436 on bus EE. The functions F3 and F4 are used to load absolute X and Y address data into registers 300, 304, 308 and 312, D0 being the least significant bit and D7 being the most significant bit. The function instruction F5 causes 4 bits of blink mask data input to lines D0-D3 to be loaded into the blink mask latch 444 via bus DD. Finally, functions F6 and F7 are used to set and reset the write protect signal 58 from pin 9 of IC unit 368.

Figure 3:
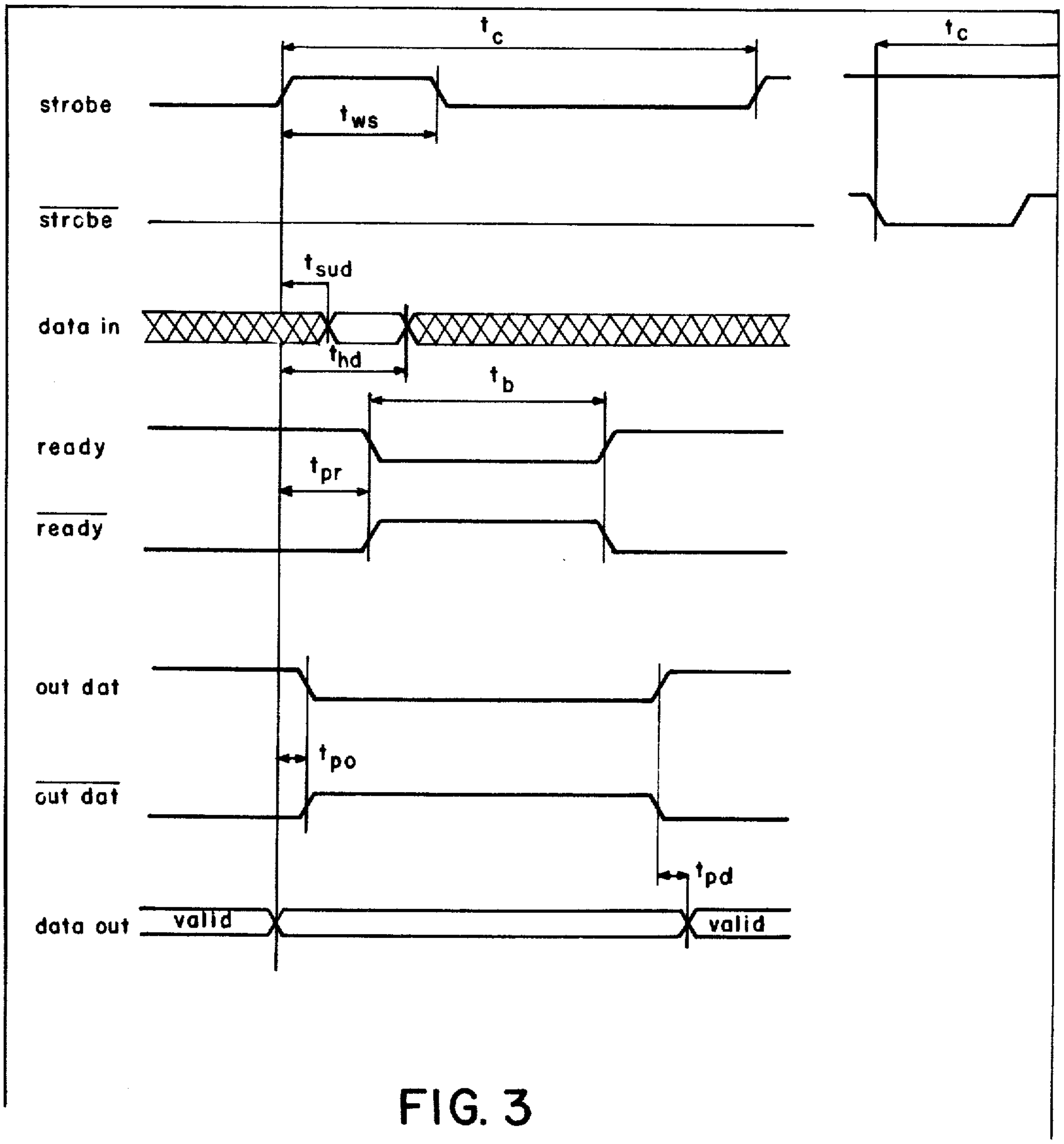
FIG. 3 is a timing diagram for the interface between the host computer and memory controller portions of the system.

Referring now to Table II in conjunction with FIG. 3, the timing of the instruction and data transfer between the host computer 20 and the controller 40 will be described. Briefly, when the computer 20 has data available for input to latches 324 and 376, a strobe or strobe complement signal is sent to the controller 40. When the controller is ready to receive data via its latches 324 and 376, it sends a ready or ready complement signal to the computer 40. Data input is then read into latches 324 and 376 between times $t_{sud}$ and $t_{hd}$. Later in the cycle, the controller 40 signals the computer 20 when output data on bus 56 is valid by generating an out dat or out dat complement signal to indicate that data output will be valid a short delay time later.

It will be appreciated from the foregoing description that the inventive system 10 provides many unique advantages over prior art systems. It will also be appreciated that while the presently preferred embodiment describes a 256 by 256 pixel memory organization, similar techniques can be employed to expand the size of the picture memory matrix by employing additional numbers of dynamic RAMs with an expanded latch circuitry. Although a preferred embodiment of the inventive system has been described in detail it is to be understood that various changes, substitutions and alterations can be made without departing from the spirit and the scope of the invention as defined by the appended claims.

APPENDIX A

PROM 108

```
/$A000,
/B7 77 77 77 F7 F6 F7 B7 B7 77 77 77 F7 F7 F7 B7
/E7 E7 D7 D7 D5 F7 F7 F7 F7 F7 FF F7 F7 F3 F7 B7
/
```

PROM 112

```
/$A000,
/22 20 00 00 00 18 28 A8 20 20 00 00 00 18 28 AA
/2A 20 20 00 00 00 04 94 44 04 04 04 04 2C 2C AE
/
```

APPENDIX B

PROM 136

```
/$A000,
/67 67 67 67 67 21 21 21 21 21 20 20 20 20 20 20
/20 20 20 20 20 20 20 20 20 20 20 20 20 20 20 20
/20 20 20 20 20 A0 B0 B0 B0 B0 B0 B0 B0 B0 B0 B0
/B0 B0 90 90 90 90 90 90 90 90 90 90 F6 F6 F6 F6
/F6 B2 B2 B2 B2 B2 B2 B2 B2 B2 B2 B2 B2 B2 B2 B2
```

APPENDIX B-continued

PROM 136

```
/B2 B2 B2 B2 B2 B2 B2 B2 B2 B2 B2 B2 B2 B2 B2 B2
/B2 B2 B2 B2 B2 32 22 22 22 22 22 22 22 22 00 00
/00 00 00 00 00 00 00 08 08 00 00 00 00 00 00 00
/
/$A080,
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/
/$A100,
/67 67 67 67 67 61 61 61 61 61 60 60 60 60 60 60
/60 60 60 60 60 60 60 60 60 60 60 60 60 60 60 60
/60 60 60 60 60 E0 F0 F0 F0 F0 F0 F0 F0 F0 F0 F0
/F0 F0 90 90 90 90 90 90 90 90 90 90 F6 F6 F6 F6
/F6 B0 B0 B0 B0 B0 B0 B0 B0 B0 B0 B0 B0 B0 B0 B0
/B0 B0 B0 B0 B0 B0 B0 B0 B0 B0 B0 B0 B0 B0 B0 B0
/B0 B0 B0 B0 B0 30 20 20 20 20 20 20 20 20 00 00
/00 00 00 00 00 00 00 08 08 00 00 00 00 00 00 00
/
/$A180,
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/
```

APPENDIX C

PROM 152

```
/$A000,
/01 03 03 42 43 43 41 03 03 01 01 01 01 01 01 05
/21 01 01 01 01 01 01 01 01 01 01 01 01 01 01 01
/01 01 01 01 01 01 01 01 01 01 01 85 85 85 85 85
/85 85 85 85 85 85 85 85 85 85 85 85 85 85 85 85
/85 85 85 85 85 85 85 85 85 85 85 85 85 85 85 85
/85 85 85 85 85 85 85 85 85 85 85 85 85 85 85 85
/85 85 85 85 85 85 85 85 85 85 85 85 85 85 85 85
/85 85 85 85 85 85 85 85 85 85 85 85 85 85 85 85
/
/$A080,
/85 85 85 85 85 85 85 85 85 85 85 85 85 85 85 85
/85 85 85 85 85 85 85 85 85 85 85 85 85 85 85 85
/85 85 85 85 85 85 85 85 85 85 85 85 85 85 85 85
/85 85 85 85 85 85 85 85 85 85 85 85 85 85 85 85
/85 85 85 85 85 85 85 85 85 85 85 85 85 85 85 85
/85 85 85 85 85 85 85 85 85 85 85 85 85 85 85 85
/85 85 85 85 85 85 85 85 85 85 85 85 85 85 85 85
/85 85 85 85 85 85 85 85 85 85 85 85 85 85 85 85
/
/$A100,
/85 85 85 85 85 85 85 85 85 85 85 85 85 85 85 85
/85 85 85 85 85 85 85 85 85 85 85 85 85 85 85 85
/85 85 85 85 85 85 85 85 85 85 85 01 01 01 01 01
/01 01 01 01 01 01 01 09 01 01 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/
/$A180,
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/00 00 00 00 00 00 00 00 00 00 00 00 00 00 00 00
/
```

What is claimed is:

1. A data processing system comprising:

host computer means for outputting binary coded color data signals;

memory means for selectively storing said binary coded color data signals including means for selectively outputting said binary coded color data signals in multiple words at a rate of outputting inversely proportional to the multiple as referenced the rate of storing;

controller means for selectively outputting display signals at a rate of output proportional to said multiple as referenced to the memory means rate of outputting, responsive to said multiple words of binary coded color data; and display means for selectively providing a visual display responsive to said display signals.

2. A data processing system comprising:

memory means for selectively storing and outputting data signals responsive to a control signal;

means for transferring said data signals grouped in a first word length into said memory means for storage; and means for transferring said data signals grouped in a second word length out from said memory means, said second word length being wider than said first word length by an integer multiple.

3. The system as defined in claim 2 further comprising:

means for selectively storing said data signals grouped in said second word length including means for selectively outputting said data signals grouped in a third word length less than said second word length, and display means for selectively providing a visual display responsive to said data signals grouped in said third word length.

4. The system as defined in claim 3 wherein the first word length is four binary digits, the second word length is sixteen binary digits, and the third word length is four binary digits.

5. The system as defined in claim 3 or 1 wherein said display means is a cathode ray tube.

6. The system as defined in claim 3 or 1 wherein said display means is a laser scanner display.

7. The system as defined in claim 3 or 1 wherein the display means is an incremental plotter.

8. A data display system comprising:

memory means organized in N-bit wide data words including means for selectively storing, at a first rate, input data signals organized in M-bit wide data words, M being an integer sub-multiple of N, responsive to a write signal, and further including means for selectively outputting, at said first rate, stored data signals as N-bit wide data words responsive to a read signal;

means for selectively storing said data signals output from said memory means including means for sequentially outputting, at a second rate, R-bit wide sub-groups of said data signals, R being an integer sub-multiple of N, less than N, said second data rate being greater than said first data rate.

9. The system as defined in claim 8 wherein said second data rate is the product of R multiplied by the first data rate.

10. The system as defined in claim 8 wherein:

N equals sixteen;

M equals four, and

R equals 4.

11. The system as defined in claim 8 further comprising:

means coupled to said sequential output means for determining the sequence in which each of the R-bit wide sub-groups of said data signals is output.

12. The system as defined in claim 8 further comprising:

display means coupled to said sequential output means for selectively providing a visual display responsive to each of said R-bit wide sub-groups of said data signals.

13. A data display system comprising:

means for providing a read control signal and a cursor control signal;

read register means for selectively storing and outputting a read mode address signal responsive to said read control signal;

cursor register means for selectively storing and outputting a cursor address signal responsive to said cursor control signal;

memory means including means for selectively storing coded data signals at the address corresponding to said cursor address signal, and further including means for selectively outputting said coded data signals from the address corresponding to said read address signal; and means for selectively storing said memory means output of coded data signals including means for selectively outputting mutually-exclusive sub-groupings of said coded data signals responsive to said read address signal.

14. The system as defined in claim 13 further comprising:

display means for selectively providing a visual display responsive to said mutually-exclusive sub-groupings of said coded data signals.

15. A data display system comprising:

means for outputting a control signal, a read signal, and a sequence signal;

first memory means cycling at a first rate for selectively storing and outputting a video data signal responsive to the control signal;

second memory means including means cycling at said first rate for selectively storing said video data signal responsive to the read signal, and further including means, cycling at a second rate faster than said first rate, for selectively outputting said video data signals sequentially in sub-groups, wherein said sub-groups are comprised of a word length being a sub-multiple of the video data signal word length as stored, responsive to the sequence signal; and, display means coupled to said second memory means for selectively providing a visual display responsive to said sub-groups of said video data signal.

16. The system as in claim 15 wherein said first rate is proportional to said second rate by the inverse of the sub-multiple.

17. The system as in claim 15 further comprising:

means for generating a blink mask signal; and, means coupled to said display means and to said blink generating means for selectively blinking a predefined color on said visual display responsive to said sub-group of said video data signal being displayed being equal to said blink mask value signal.

18. The system as defined in claim 17 further comprising:

first register means for selectively storing said video data signal as output from said second memory means, including means for selectively outputting said stored video signals;

second register means for selectively storing and outputting a blink mask signal;

comparator means for selectively outputting a mask signal responsive to detecting equivalency between said first register means output video data signal and said blink mask signal; and means for forcing said first register means to store and output a predefined video data signal responsive to said mask signal.

19. The system as defined in claim 18 further comprising:

means for selectively blinking the visual display between a first color and a second color responsive to said mask signal.

20. The system as defined in claim 18 or 19 further comprising:

means for selectively causing a predefined color and non-color visual display to appear on the display means responsive to said mask signal.

21. The system as defined in claim 20 wherein said pre-defined color is determined by said blink mask data signal.

22. The system as defined in claim 18 or 19 further comprising:

means for selectively performing logical and arithmetic operations on said video data signals as output by said second memory means, including means for selectively storing the operated on video data signals in the first register means in the place of the video data signals as output by said second memory means.

23. A data display system comprising:

memory means for outputting a video data signal;

first register means for selectively storing and outputting said video data signal;

second register means for selectively storing and outputting a blink mask signal;

comparator means for selectively outputting a mask signal responsive to detecting an equivalence between said blink mask signal and said video data signal;

means for forcing said first register means to output a pre-defined video data signal responsive to said mask signal;

display means for providing a visual display responsive to said video data signal as output from said first register means.

24. The system as defined in claim 23 further comprising:

means for causing said visual display to alternate between a first color and a second color at a predefined rate responsive to said mask signal.

25. The system as defined in claim 24 wherein said first color is determined by said blink mask signal.

26. The system as defined in claim 12 or 14 or 23 wherein said display means is a cathode ray tube.

27. The system as defined in claim 12 or 14 or 23 wherein said display means is a laser scanner display.

28. The system as defined in claim 12 or 14 or 26 wherein said display means is an incremental plotter.

29. A digital color graphic imaging system comprising a control unit (40) and a display monitor (30) characterized in that the system includes:

a video memory (50) organized as a number of matrixes (M1-M16) for storing binary information units defining different columns in definite points of the monitor (30) and for storing binary units defining write prohibition information in said definite points;

a circuit arrangement (64) coupled to said video memory for transmitting color information from an external controlling computer (20) to said display monitor;

an arithmetic and logic unit (436) coupled to said video memory and the controlling computer for producing picture information by combining information from the controlling computer with previously stored information in order to decrease the load on the computer;

circuit means (300, 304, 308, 312) coupled to said video memory for incrementing or decrementing by "1" the address information in X and/or Y display monitor direction upon receiving said color information from said controlling computer in order to plot a continuous curve on the monitor; and, circuit means (324) coupled to said video memory for abitrarily selecting addresses defining the starting point of a curve.

30. A digital color graphic imaging system according to claim 29, characterized in that said video memory is organized in such manner that writing is carried out word after word where each word defines one point on the monitor, whereas reading out of the information is carried out simultaneously for a number of points.

* * * * *